April 29, 1958 A. P. HENRY 2,832,317
VALVE CONTROLLED HYDRAULIC ACTUATING DEVICE
Filed May 17, 1955
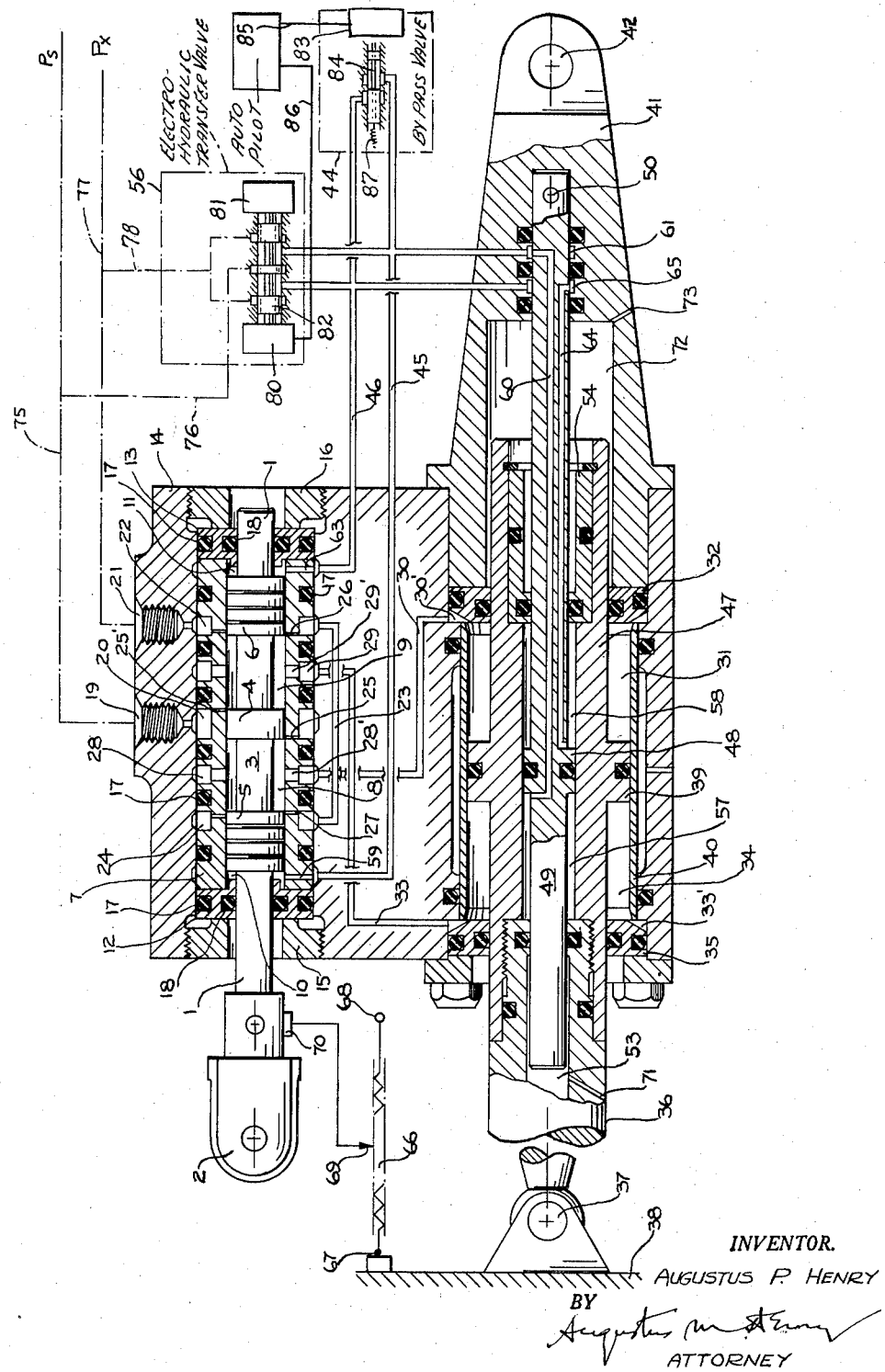
INVENTOR.
AUGUSTUS P. HENRY
BY
ATTORNEY

United States Patent Office 2,832,317
Patented Apr. 29, 1958

2,832,317

VALVE CONTROLLED HYDRAULIC ACTUATING DEVICE

Augustus P. Henry, Los Angeles, Calif., assignor, by mesne assignments, to Kelsey-Hayes Company, Detroit, Mich., a corporation of Delaware Application March 17, 1955, Serial No. 494,957

6 Claims. (Cl. 121—41)

This invention relates to new and useful improvements in a valve controlled hydraulic actuating device.

A valve controlled hydraulic actuating device, as that phrase is used herein, is a device incorporating both an input element and an output element, which output element is sensitive to positional changes of the input element relative to a fixed reference frame and is instantly responsive to said positional changes. In such a device, also, the power level, or stroking force, of the output element is very much greater than the power level, or stroking force, at the input element, hereinafter called the valve.

The power medium is a source of pressurized fluid supplied by an external agent. The fluid is generally but not necessarily a relatively incompressible fluid such as a mineral base oil, and the external agent (pump) is presumed to be capable of supplying pressurized fluid in sufficient volume and at a regulated pressure so that the fluid supply to the device exists at essentially constant high pressure (say 3000 p. s. i.) regardless of the volumetric demands of the valve controlled actuating device.

A cardinal aim of the present invention is to provide a new and improved servo mechanism. A servo mechanism is a device which is capable of accepting an input signal of a low power level and which is capable of continuously adjusting the position of its output element at a high power level so as to maintain the system instantaneous error continuously at a small magnitude and ideally zero in a steady state condition. Said steady state condition is that which exists after all transients have died out or otherwise relaxed. The instantaneous error, in the sense this phrase is used herein, is the absolute positional difference, at any instant of time, which exists between the position of the input element (valve) and the corresponding position of the output element. Thus, as in any servo mechanism, the motivating influence which governs the positional condition and the changes in the positional condition of the output element of the present invention is the existence of and the condition of an instantaneous error; such error being the lack of correspondence between the position of the input element (valve) and the position of the output element, both positions being relative to the same reference frame. In speaking of the position of the valve, there is meant the position of a movable member, as a longitudinally displaceable valve spool, in the valve.

The present invention embodies within its combination means for continuously comparing the position of the input element, as, for example, the valve spool longitudinal displacement, relative to the position of the output element; which latter is hereinafter referred to as the actuator. In addition means are provided within the combination of the present invention whereby the actuator will adjust its position according to any lack of correspondence between the positions of the input element (valve) and of the output element (actuator) so that said lack of correspondence will cease to exist. Thus the actuator will follow up, in a positional sense, the positional variations of the valve spool which is under continuous positional control by an outside agent.

The present invention concerns itself with a valve controlled hydraulically powered servo actuating device which is of particular usefulness as a component in the primary flight control system of a piloted aircraft, including such usefulness in the automatic navigation and fire control subsystems.

The present invention does not concern itself with the type of feedback loop employed for comparison of the position of the input element relative to the position of the output element. The several means whereby this comparison may be made are well known in the state of the art.

The present invention provides within its structure by virtue of the unique cooperation of its several coacting elements means whereby the device is capable of accepting one or the other of two controlling inputs with resulting controlled output positioning of, say, an aircraft flight control surface, with in such case the controlling input either that supplied by the human pilot or that supplied by an automatic pilot.

The primary object of this invention is to provide a multi-function valve controlled hydraulic actuating device which combines the several control functions within the single structure, which combination of functions is characterized by reliability, and which structure is characterized by reliability, and which structure is characterized by ease of field maintenance, marked reduction in the weight and volume requirements of the affected subsystems, all in a device which, moreover, may be readily produced by existing manufacturing methods.

A further object of this invention is to provide a device which is capable of reduction to a specific design by those skilled in the particular arts which are applicable, so that said design shall be compatible in all respects with the requirements imposed upon said design by the peculiar dynamic characteristics of the airframe in which it is to be used.

In exemplification of the invention, a now preferred embodiment thereof is shown in the accompanying drawing; the figure of which is a cross-sectional view of the device, taken in a vertical plane including the longitudinal center line of the actuator. It will be noted that this view is partially schematic, to clarify and simplify the disclosure.

Referring now in detail to the structure thus illustrated, reference numeral 1 designates the shaft extensions of the valve spool. Secured to one shaft extension of the valve spool is clevis 2, to which latter the mechanical link from the pilot's control stick or column is attached.

The valve spool is shown as comprised of a constant diameter shank 3 on which are three enlarged diameter lands. The central land is designated 4, and the two outboard lands are designated 5 and 6; said shank, lands and end shaft extensions being integral with one another. The three lands are in intimate sliding relationship with the sleeve 7, thereby to provide sealing means for isolating fluid in the annular chamber 8 from fluid in the annular chamber 9 and from fluid in the annular chambers 10 and 11 formed beyond the outboard lands 5 and 6 and between them, the shaft extensions 1 and the valve sealing bushings 12 and 13. Sleeve 7 is positioned in a longitudinal bore in a housing 14. End caps 15 and 16 are suitably secured to, herein shown as threaded into, housing 14, to prevent endwise shifting of sleeve 7 and of the sealing bushings 12 and 13.

Housing 14 is shown as an integral unit not only to house the input element (the valve as just above partially described), but also fixedly to carry the output element. As will be noted the housing 14 is hatched merely over portions of the section thereof shown; this in order further to clarify the drawing while keeping it as simple as possible.

The valve sleeve 7 and the bushings 12 and 13 are provided with O-ring static seal members 17 at their outside diameters. These seal members 17 prevent leakage between any of the points of varying pressure level along the outside of the sleeve 7 in the longitudinal bore through the housing 14 between the end bushings 12 and 13. The end bushings 12 and 13 are also provided with O-ring sliding seal members 18 which prevent leakage of fluid from chambers 10 and 11 around the valve spool shaft extensions 1.

Fluid at a constant high pressure $P_s$, assumed admitted through a suitable threaded fitting (not shown) applied as at 19, enters an annular groove 20 machined into the outer surface of sleeve 7. Fluid is discharged at nominally atmospheric pressure $P_x$ through a suitable threaded fitting (not shown) applied at 21. Communicating with outlet 21 is external annular groove 22 of the valve sleeve 7; and said groove 22, by way of several interconnected drilled passages in housing 14, these passages collectively diagrammatically indicated at 23, is connected with external annular groove 24 of the valve sleeve 7. Fluid at high pressure $P_s$ in annular groove 20 is guided toward valve spool land 4 through one hole or a suitable series of holes one of which is indicated at 25, and also toward said valve spool land 4 through one hole or a suitable series of holes one of which is indicated at 25'.

Fluid at return line pressure $P_x$ in annular groove 22 is guided toward valve spool land 6 through one hole or a suitable series of holes one of which is indicated at 26; and fluid at said pressure $P_x$ in annular groove 24 is guided toward valve spool land 5 through one hole or a suitable series of holes one of which is indicated at 27.

Said holes or sets of holes 25, 25', 26 and 27 are drilled or otherwise formed in the fixed valve sleeve 7; and desirably with said holes in sets, each hole set 25, 25', 26 and 27 is formed of a multiplicity of holes whose center lines, while preferably extended to intersect the valve center line at right angles thereto, are spaced longitudinally of the sleeve 7 so that as the valve spool is displaced one hole after another opens in planned sequence. This longitudinal spacing of the holes of a set makes it possible to obtain a valve characteristic which is linear, that is, a valve flow rate proportional to valve spool displacement.

As the valve spool is displaced, say to the right of the figure, chamber 8 of the valve is opened to high pressure fluid in annular chamber 20, by way of said hole or set of holes 25 and through a restricted orifice or equivalent of a restricted orifice formed by land 4 and said hole or hole set 25. Simultaneously fluid in valve chamber 9 is constrained to flow through the restricted orifice or equivalent formed by land 6 and said hole or hole set 26; the design of the parts being such as to give to the last-mentioned orifice or equivalent, at any extent of spool displacement to the right, the same cross-sectional area as afforded at the same instant by the orifice or orifice equivalent constituted by the hole or holes 25.

The orifice or orifice equivalent constituted by the hole or hole set 26 connects as already stated with annular groove 22, which latter leads to the outlet at 21.

When, on the other hand, by appropriate movement of the pilot's control stick or column, its connection to the clevis 2 causes valve spool displacement to the left of the figure, chamber 9 of the valve is opened to high pressure fluid in annular chamber 20, by way of said hole or hole set 25' and through a restricted orifice or orifice equivalent formed by land 4 and said hole or hole set 25'. Simultaneously fluid in valve chamber 8 is constrained to flow through the restricted orifice or equivalent formed by land 5 and said hole or hole set 27; the design of the parts being such as to give the last-mentioned orifice or equivalent, at any extent of spool displacement to the left, the same cross-sectional area as afforded at the same instant by the orifice or equivalent constituted by the hole or holes 25'.

And, also, as already stated, the orifice or orifice equivalent constituted by the hole or hole set 27 connects with the outlet 21—by way first of the annular groove 22 and next by way of the passages collectively diagrammatically indicated at 23 as aforesaid, and next by way of annular groove 20.

Further formed on the valve sleeve 7 are external annular grooves 28 and 29, the former being open as at 28' to the valve chamber 8 and the latter being open as at 29' to the valve chamber 9.

A conduit delineation is diagrammatically given at 30, this representing a plurality of appropriately intersecting drilled passages in housing 14, leading from said annular groove 28 in the valve sleeve to the end portion 31 of the piston chamber of the actuator adjacent to the actuator end bushing 32. The end bushing 32, provided with O-ring seal members as shown, is, interruptedly around around its inner periphery at its inner face, relieved by a series of radially dispersed slots as indicated at 30' for maintaining open communication between the drilled passages just above referred to and the end portion 31 of the piston chamber of the actuator.

Another conduit delineation is diagrammatically given at 33, this also representing a plurality of appropriately intersecting drilled passages in housing 14, but with these leading from the annular groove 29 in the valve sleeve to the end portion 34 of the piston chamber of the actuator adjacent to the actuator end bushing 35. The end bushing 35, provided with O-ring seal members as shown, is, interruptedly around its inner periphery at its inner face, relieved by a series of radially dispersed slots as indicated at 33' for maintaining open communication between the drilled passages last above referred to and the end portion 34 of the piston chamber of the actuator.

The actuator piston rod has an extension 36 which is secured rigidly, as at 37, to airframe structure 38. An enlarged diameter section on the piston rod forms piston head 39, which latter is provided with an O-ring seal member as indicated. Piston head 39, a sleeve 40, the portion of the piston rod to the left of the piston head, and actuator end bushing 35, form actuator chamber 34, that is, the end portion of the piston chamber of the actuator adjacent to said end bushing 35. Similarly, piston head 39, sleeve 40, the portion of the piston rod to the right of the piston head, and actuator end bushing 32, form actuator housing chamber 31, that is, the end portion of the piston chamber of the actuator adjacent to said end bushing 32. Said sleeve 40 is shown as provided with O-ring seal members as indicated.

*Operation under control of human pilot*

This, as aforesaid, is effected by thrust or pull from the control stick or column, applied longitudinally of the valve spool, as at the clevis 2.

On displacement of the valve spool to the right, consequent upon such a thrust, valve action takes place as previously described, that is, fluid is caused to flow, via 20 and 25, into valve chamber 8, and thence, via 28', 28 and 30, to the actuator chamber 31. Simultaneously, also as previously described, fluid is permitted, via 26 and 22, to flow out of the valve chamber 9, and hence, via 33, 29 and 29', from the actuator chamber 34.

Therefore, the volume of actuator chamber 31 is made to increase, while the volume of actuator chamber 34 is permitted to decrease, both changes in volume being precisely equivalent.

Because the actuator piston rod extension 36 is secured to structure, said volumetric changes constrain the actuator housing 14, with the result that actuator extension 41 is forced to move to the right. This motion will continue until the movement of the valve sleeve 7 (fixed within and transported with housing 14) is sufficient to block off orifice or orifice equivalents 25 and 26.

Carried by the actuator is attach point 42 whereby connection is had to an aircraft control surface actuating horn.

On displacement of the valve spool to the left, as the result of a pull from the pilot's control stick or column, the valve action, also as previously described, is such that fluid is caused to flow, via 20 and 25', into the valve chamber 9, and at the same time, via 27 and 24, to flow out of the valve chamber 8, and hence, via 30, 28 and 28', from the actuator chamber 31.

In this case, the volume of actuator chamber 34 is made to increase, while the volume of actuator chamber 31 is permitted to decrease, both changes in volume being precisely equivalent.

Again, because the actuator piston rod extension 36 is secured to structure, said volumetric changes constrain the actuator housing 14, now with the result that actuator extension 41 is forced to move to the left; and this motion will continue until the movement of the valve sleeve 7 is sufficient to block off orifice or orifice equivalents 25' and 27.

Thus always during control of the aircraft by the human pilot and by way of the hydraulic servo as illustratively shown and described herein, the valve spool position, relative to a reference plane fixed in the aircraft, is enslaved to the position of the pilot's stick or column. The hydraulic servo as herein shown and described has inherent unity feedback, although this one to one feedback ratio is not necessarily a requirement of the invention.

The follow up action of the actuator 41 causes it to respond to changes of position of the valve spool relative to the sleeve 7 in which it operates. As the outside agent—the human pilot's manual input, causes an initial displacement of the valve spool relative to structure, this initial displacement is relative to the actuator, as that is initially stationary. The valve sleeve 7, at the same time, is fixed relative to the actuator housing 14, which latter, it will be recalled, is the movable output element.

As will also be recalled, any displacement of the valve spool relative to the sleeve 7 in which it operates, results, by the coaction of the several lands 4, 5 and 6 included in the valve spool configuration and spaced apertures in the sleeve 7, in the formation of sets of restricted area openings through which pressurized fluid is constrained to flow to and from otherwise isolated chambers (31 and 34) within the actuating element. This flow causes a corresponding change in the position of the actuator 41—and also of housing 14, on which 41 is affixed; such change in position being at a rate proportional to the volumetric flow rate through the several metering ports formed by a valve spool displacement relative to the sleeve 7 in which it operates.

This condition exists until the actuator has moved to its new equilibrium position, at which position the actuator will have displaced itself and with it the valve sleeve 7 to that precise position where the valve ports have been closed and a correspondence between the actuator output position and the valve spool position as controlled by the human pilot has been re-established.

During operation under control of the human pilot, the two valve end chambers 10 and 11, respectively beyond the valve spool lands 5 and 6 (the operative purposes of which end chambers will be made clear hereinbelow incidental to description of the autopilot control), are protected against hydraulic lock by utilization of a by-pass valve, permitting a short circuit relative to said chambers while the system is under manual control. Such by-pass valve, which as is well-known in the hydraulics art is characterized by the inclusion of a valve member movable to one position whereat flow through the valve is permitted and to another position whereat flow through the valve is cut off, is indicated at 44. At 45 is represented a conduit for connecting said end chamber 10 with the valve 44, and at 46 is represented a conduit for connecting said end chamber 11 with the valve 44, in such manner that in the first-mentioned, or open, position, of the valve member in valve 44, the conduits 45 and 46 are interconnected, while in the second-mentioned, or closed, position of the valve member in the valve 44, the conduits 45 and 46 are cut off one from the other. During operation under control of the human pilot, the valve 44, being then with its valve member in said open position, functions to prevent hydraulic lock because of fluid at any time and in any amounts in the valve end chambers 10 and 11.

The said by-pass valve 44 should be as close, hydraulically speaking, to the main valve spool and chambers 10 and 11 as possible in order to minimize damping forces at the valve spool. Excessive spool damping feels like mass (inertia) reflected to the pilot's control station.

In the illustrative showing of a by-pass valve, at 44, the same includes, it will be noted, a valve spool 84 urged toward valve opening position by a spring 87 but held to valve closing position by a solenoid 83 when energized by electrical input through a connection 85 from the autopilot.

The means for at the proper times throwing the valve 44 to open or closed condition, and for simultaneously throwing a hereinbelow described valve 56 to closed or open condition, according as supply of the control input is to be from the human pilot or the autopilot, may be of any kind, for instance manual, as solenoid and pushbutton means, or solenoid means energized in agreement with a manual throwing in or out of the autopilot.

As herein shown the system incorporates an actuator piston 39, which is a balanced area one, and consequently the control valve, or input element, is of the type commonly termed in the hydraulic art a four-way valve; but as will be understood, the design could be such that a so-called three-way valve could be employed as the control valve or input element with then the actuator piston an unbalanced area one.

*Autopilot control*

Next to consider provisions of the present invention, as present in the illustrative embodiment thereof herein shown and described, whereby to permit control input to be whenever desired that supplied by the automatic pilot—

It will be noted that the actuator piston rod which carries the balanced area actuator piston 39 is in the form of a tubular shaft 47 containing a bore in which is slidingly contained a smaller balanced area piston 48 integral with a piston rod 49. The piston 48, herein called the autopilot response piston, is movable relative to the piston 39, in which connection it is pointed out that the piston rod 49 is secured as at 50 to the actuator output member 41.

Actuator piston rod extension 36 is shown as threaded into the left hand end of the actuator piston rod and also as provided with a static O-ring seal member to make fluid tight the coupling of said extension 36 to the actuator piston rod. Said extension is tubular as indicated, for entry therein of the left hand extension of the piston rod 49, and is provided with a sliding O-ring seal member as indicated, to prevent leakage between the left hand end extension of piston rod 49 and actuator piston rod extension 36. Said tubular shaft 47 constituting the actuator piston rod is provided at its right hand extension with a bushing 54. Bushing 54 is provided with a static O-ring seal member as indicated to prevent fluid leakage between said bushing and tubular shaft 47 and also with a sliding O-ring seal member as indicated to prevent fluid leakage between said bushing and the right hand extension of piston rod 49. In addition piston rod 48, as aforesaid integral with piston rod 49, is provided with an O-ring seal member as indicated to prevent fluid leakage from one side of said piston to the other.

At 56 is indicated an electro-hydraulic transfer valve of the type well-known in the hydraulics art. The two chambers 57 and 58 established in the bore of the hollow piston rod 47, at the opposite sides of the autopilot response piston 48, are served by the transfer valve 56 while the autopilot is functioning. At that time, also, the by-pass valve 44 has its valving member closed, isolating conduit 45 from conduit 46.

In the illustrative showing of an electro-hydraulic transfer valve, at 56, the same, it will be noted, is a four-way valve and includes a valve spool 82 at the opposite ends of which are solenoids 80 and 81 for positioning the valve spool in accordance with electrical signals transmitted through a connection 86 from the autopilot.

Conduit 45 not only, as already stated, communicates with the left hand valve spool chamber 10, and with by-pass valve 44 (which now, that is, for autopilot operation, is closed), but also with autopilot transfer valve 56, and with piston chamber 57 at the left hand side of the autopilot response piston 48. Said conduit 45 is shown as opening into the said left hand valve spool chamber 10 by way of a drilled passage 59 in valve sleeve 7, and as connected with said piston chamber 57 by way of the drilled passages 60 in piston rod 49 and annular groove 61 of the actuator extension 41.

Conduit 46 not only, as already stated, communicates with the right hand valve spool chamber 11, and with said by-pass valve 44, but also with autopilot transfer valve 56, and with piston chamber 58 at the right hand side of the autopilot response piston 48. Said conduit 46 is shown as opening into the right hand valve spool chamber 11 by way of a drilled passage 63 in valve sleeve 7, and as connected with said piston chamber 58 by way of the drilled passages 64 in piston rod 49 and annular groove 65 of the actuator extension 41.

As further regards either conduit 45 or 46, said conduit is partially formed of appropriately intersecting drilled passages in housing 14 and partially formed of external plumbing or tubing external of housing 14.

*Operation under autopilot control*

Assume that the device initially is at rest and stationary. A signal, electrical in nature, is accepted by the electro-hydraulic transfer valve 56. Recall in this connection that the device is a servo mechanism. Therefore the signal which is accepted by valve 56 represents an instantaneous error or lack of correspondence between the actuator present output position and the actuator output position commanded by the autopilot. This meaning of instantaneous error, as the phrase is used herein, has been explained hereinabove.

Say that the autopilot commands the actuator to move to the right. The transfer valve 56 ports pressurized fluid into conduit 45 while simultaneously allowing fluid to flow out of conduit 46. Conduit 45 as already stated communicates with chamber 57. Initially, chamber 57 cannot accommodate the change in volume through conduit 45 because the primary actuator is hydraulically locked by the pressurized fluid trapped in actuator chambers 31 and 34. Because conduit 45 communicates with the valve spool chamber 10, as above described, the initial volumetric change supplied by the transfer valve 56 must necessarily be accommodated by a corresponding increase in the volume contained in valve chamber 10. This is possible because the valve spool is slidable relative to sleeve 7 in which said spool operates.

Initially, then, from a position of rest, flow from transfer valve 56 into conduit 45 results in displacement to the right of the main valve spool relative to sleeve 7 in which it operates. Immediately, the actuator output member 41, in the manner as has been described herein (in discussing operation under control of human pilot), moves to the right at a rate proportional to the displacement of the valve spool relative to said sleeve 7 in which it operates. Actuator output motion results in an increase in volume of chamber 57, which volumetric rate of increase is precisely proportional to the actuator linear velocity. At this time the increasing volume of chamber 57 is able to accommodate the volumetric delivery of the electro-hydraulic transfer valve 56 without further displacement of the valve spool relative to said sleeve 7 in which it operates.

It is to be noted that the volumetric delivery of transfer valve 56 is accommodated by the sum of the volumetric change of valve spool chamber 10 plus the volumetric change of chamber 57.

(For a steady state velocity to the right, say, the transfer valve is receiving a constant amplitude signal from its associated error sensor and amplifier, and is delivering fluid at a constant rate into the conduit 45. This constant volumetric rate is being accommodated by the constantly increasing volume of chamber 57, which volumetric increase is caused by actuator output at a constant linear velocity to the right, which velocity is a result of main valve spool fixed displacement to the right relative to sleeve 7.

(Thus for a commanded constant actuator output velocity, a unique main valve spool position relative to its coacting sleeve is called for. If the main valve spool is displaced at any point other than said unique point, the internal loop, that is, the self compensating feature just above described, between the autopilot response piston 48 and the main valve spool in the sleeve 7, immediately results in said valve spool displacing itself relative to said sleeve to that precise point wherein the conditions required and described above are satisfied.)

Simultaneous with the admission of fluid through transfer valve 56 into conduit 45, decreases in volume of valve spool chamber 11 plus decrease in volume in chamber 58 of the outopilot response piston is discharged from conduit 46 through the transfer valve 56, the flow into conduit 45 being precisely equivalent to the flow out through conduit 46.

The above described action continues until the initial auto-pilot command is satisfied. This condition of correspondence between the actuator output position and autopilot command is detected by the autopilot feedback sensor. Said sensor may be, but is not necessarily a potentiometer as indicated schematically in the figure. The potentiometer is shown as consisting of a resistive element 66 fixed to structure 38 and having a voltage impressed across its terminals 67 and 68. A wiper point 69 is in physical contact with resistive element 66 and moves relative thereto, as the main valve, to whose end extension 70 it is fixed, moves while being transported by housing 14. Thus the voltage between wiper 69 and terminal 67 or 68 is a measure of actuator output position (less the displacement of the main valve spool relative to the sleeve 7 and hence relative to the actuator housing 14). This voltage is transmitted to the autopilot amplifier wherein in a manner well understood in the art it is subtracted from autopilot command input, the difference resulting being by definition the autopilot error.

As the actuator output position changes in response to an autopilot command, the autopilot error diminishes. Reduction of autopilot error simultaneously reduces the flow rate through the autopilot transfer valve 56, and allows the actuator output velocity to diminish with (and resulting from) a reduction in the displacement of the main valve spool relative to its co-acting sleeve 7. Simultaneously, as the autopilot error is reduced to zero, the flow through the autopilot transfer valve reduces to zero, the main valve spool attains its neutral position relative to the sleeve 7 in which it operates, and actuator output motion stops.

For an autopilot command calling for actuator motion to the left, a symmetrically opposite set of events takes place. Fluid is admitted by the transfer valve 56 into conduit 46 with a correspondingly equivalent flow out of conduit 45. Initially an accommodating increase in the volume of valve spool chamber 11, displaces the valve loop to the left relative to the sleeve 7 in which it operates. Main valve action results in actuator motion to the left. The then resulting increase in volume of chamber 58 accommodates the flow into conduit 46 and thus prevents or otherwise limits further relative displacement of the main valve spool. Such action continues until the autopilot command is satisfied, at which point the autopilot transfer valve 56 discontinues its porting of fluid into conduit 46 while simultaneously the main valve spool re-centers itself and actuator output motion stops.

In the structure shown in the figure, the chamber 53 formed within actuator rod extension 36 is shown as suitably vented to atmosphere by means of drilled hole 71. Likewise the chamber 72 located at the right hand extension of tubular piston rod 47 is vented to atmosphere by means of drilled hole 73. Such venting is necessary in order to eliminate any possibility of trapped fluid in chamber 53 and/or in chamber 72 inhibiting the controlled positional changes of the output member.

Schematically indicated in the figure are a conduit 75 for supplying the pressurized fluid and leading to the main valve inlet 19, a conduit 76 branching off from the conduit 75 and leading to the autopilot transfer valve 56; and also a conduit 77 for receiving from the main valve outlet 21 fluid at nominally atmospheric pressure, and a conduit 78 leading to said conduit 77 and for receiving from the autopilot transfer valve 56 fluid at nominally atmospheric pressure.

As will now be understood, the present invention attains the integration within a single package of the functions of a dual input servomechanism. The inputs may (as described hereinabove, but not necessarily) originate at a control station which is manned by a human operator, as, for instance, a human pilot, or at a control station which accepts automatic signals, as, for instance, an electro-hydraulic transfer valve responsive to electrical signals from an autopilot.

By means of integration of functions as described, the single actuator, in conjunction with the main valve spool ends, performs the functions of two actuating elements. In a practical sense this means that one separate actuator has been eliminated. In the illustrated case the autopilot actuator as a separate item has been dispensed with. The advantages attained allow for weight and volume reduction, ease of maintenance, and because of system simplification a general enhancing of system overall reliability is achieved.

It can be shown mathematically that the composite system as described in the foregoing specification is dynamically precisely equivalent to a conventional system with autopilot tie-in under the following restrictions (a) If the area of the main valve spool end (chamber 10 or chamber 11, the two being equal in area) is equal to the area of the replaced autopilot actuator piston, (b) And if, at the same time, the area of the autopilot response piston (chamber 57 or chamber 58, the two being equal in area) is equal to the area of the main valve spool ends (chamber 10 or chamber 11).

If the area of the autopilot response piston is less than (b), the composite system stability margin decreases. An extreme case is when the autopilot response piston area is zero, that is, the response piston is omitted entirely. Under such conditions the system tends to become oscillatory and under actual real load conditions would likely become unstable, which is to say that the amplitude of oscillation increases with time.

On the other hand if the area of the response piston is made larger than (b), system stability margin can be increased. This is a very great advantage as it provides the designer with an additional new design parameter for adjusting subsystem stability to be compatible with complete system (including airframe) dynamic requirements. This up to now has always been a serious problem. Because of the relatively small areas involved, increasing response piston area is not normally a difficult design task.

It is to be appreciated that the system with autopilot tie-in according to the present invention is of great usefulness in both fixed and rotary wing aircraft control systems. The system can be of widespread usefulness, moreover, in other than aircraft applications such as, for example, in ship and submarine steering, machine tool control and the like.

As will be understood, only one of the various possible embodiments of the invention has been shown. This has been described with considerable particularity of detail, not for purpose of limitation, of course, but to illustrate the various capabilities of the invention. As will be understood, variations and modifications are possible, and parts of the improvements may be used without others. The scope of protection contemplated is to be taken primarily from the appended claims interpreted as broadly as is consistent with the prior art.

I claim:

1. A hydraulically actuated servo mechanism comprising, in combination, a control valve, an input element constituted by a valve spool included in said valve, an output element movable in either of two directions, means whereby said output element is moved in one of said two directions or the other according as said valve spool in response to an input from one source is moved in one direction or the other, and an auxiliary means responsive to receipt thereby from a source other than the first-named one of an input in either of two directions for coacting with said valve to cause said output element to move in one or the other of said two directions according as the input from the said other source is in one or the other of said two directions, said valve spool intermediate its ends carrying a plurality of lands and the control valve having two end chambers each outward of said lands, the first-named means including cylinder and piston means and conduit means connecting the latter and the interior of the control valve elsewhere than at said outward chambers, and the said auxiliary means including other cylinder and piston means, said auxiliary means including said two end chambers of the control valve and an electro-hydraulic transfer valve and conduit means connecting said transfer valve with said end chambers and also with the cylinder of said auxiliary means at the opposite sides of the piston thereof, there being a by-pass valve operatively associated with said end chambers effective when opened to prevent hydraulic lock at said end chambers while said transfer valve is inoperative.

2. A hydraulically actuated servo mechanism comprising in combination, a control valve, an input element constituted by a valve spool included in said valve, an output element movable in either of two directions, means whereby said output element is moved in one of said two directions or the other according as said valve spool in response to an input from one source is moved in one direction or the other, and means responsive to receipt thereby from a source other than the first-named one of an input in either of two directions for coaction with said valve to cause said output element to move in one or the other of said two directions according as the input from the said other source is in one or the other of said two directions, said valve spool intermediate its ends carrying a plurality of lands and the control valve having two chambers each outboard of said lands, the second-named means including said outboard chambers, the first-named means including cylinder and piston means and conduit means connecting the latter and the interior of the control valve elsewhere than at said outboard chambers, the second-named means including other cylinder and piston means, there being a hydraulic system including both the first-named and the second-named means, and means in said system variable at will for operationally excluding from said system or including in said system the second-named means, said variable means including a valve so interposed in said system that in one setting of said valve means said second-named means is operative and in another setting of said valve means said second-named means is inoperative, said valve means including an electro-hydraulic transfer valve and a by-pass valve, said variable means further including a conduit means having a conduit between said transfer valve and one of said outboard chambers and a branch from said conduit connecting it with said by-pass valve and also another branch from said conduit connecting it with the second-named cylinder and piston means at an end portion of its cylinder at one side of its piston, and said variable means further including a conduit means having a conduit between said transfer valve and the other of said outboard chambers and a branch from the last-named conduit connecting it with said by-pass valve and also another branch from said last-named conduit connecting it with said second-named cylinder and piston means at an end portion of its cylinder at the other side of the piston.

3. A hydraulically actuated servo mechanism comprising, in combination, a control valve, an input element constituted by a valve spool in said valve, an output element movable in either of two directions, a housing fixedly carrying said output element, means including conduit means for pressurized fluid whereby said output element by action of said fluid can be moved in one of said directions or the other according as said valve spool in response to an input from one source is moved in one direction or the other, and an auxiliary means responsive to receipt thereby from a source other than the first-named one of an input in either of two directions for coaction with said valve to cause the output element to move in one or the other of said two directions according as the input from said other source is in one or the other of said two directions, the sleeve of said valve being fixedly carried by said housing, the first-named means including a cylinder and piston couple the cylinder of which is constituted by a chambering in said housing, said couple including a tubular piston rod carrying the piston, there being a second cylinder and piston couple of which the cylinder is inside said tubular piston rod and of which the piston is secured to the housing, said valve spool intermediate its ends having a plurality of lands thereon and the control valve having two chambers each outboard of said lands, said auxiliary means including said end chambers and an electro-hydraulic transfer valve and a conduit means connecting said transfer valve with said end chambers and also with the cylinder of said second couple at opposite sides of the piston of said couple, there being a by-pass valve operatively associated with said end chambers effective when opened to prevent hydraulic lock at said end chambers while said transfer valve is inoperative.

4. A hydraulically actuated servo mechanism comprising, in combination, a control valve, an input element constituted by a valve spool in said valve, an output element movable in either of two directions, a housing, means including conduit means for pressurized fluid whereby said output element by action of said fluid can be moved in one of said directions or the other according as said valve spool in response to an input from one source is moved in one direction or the other, and an auxiliary means responsive to receipt thereby from a source other than the first-named one of an input in either of two directions for coaction with said valve to cause the output element to move in one or the other of said two directions according as the input from said other source is in one or the other of said two directions, the first-named means including a cylinder and piston couple the cylinder of which is constituted by a chambering in said housing, said couple including a tubular piston rod carrying the piston, there being a second cylinder and piston couple of which the cylinder is inside said tubular piston rod and of which the piston is secured to the housing, said spool intermediate its ends having a plurality of lands thereon and the control valve having two chambers each outboard of said lands, said auxiliary means including said end chambers and an electro-hydraulic transfer valve and a conduit means connecting said transfer valve with said end chambers and also with the cylinder of said second couple at opposite sides of the piston of said couple, there being a by-pass valve operatively associated with said end chambers effective when opened to prevent hydraulic lock at said end chambers while said transfer valve is inoperative.

5. A hydraulically actuated servo mechanism comprising, in combination, a control valve, an input element constituted by a valve spool in said valve, an output member movable in either of two directions, a housing, means including conduit means for pressurized fluid whereby said output member by action of said fluid can be moved in one of said directions or the other according as said valve spool in response to an input from one source is moved in one direction or the other, and an auxiliary means responsive to receipt thereby from a souce other than the first-named one of an input in either of two directions for coaction with said valve to cause the output member to move in one or the other of said two directions according as the input from said other source is in one or the other of said two directions, the first-named means including a cylinder and piston couple the cylinder of which is constituted by a chambering in said housing, said valve having two chambers each outboard of one of the two ends of the valve spool, said couple including a tubular piston rod carrying the piston, there being a second cylinder and piston couple of which the cylinder is inside said tubular piston rod, there being secured to the housing a piston rod carrying the piston of said second couple, said auxiliary means including further conduit means and an electro-hydraulic transfer valve operably associated with said further conduit means, said further conduit means connecting said transfer valve with one of said chambers and with the cylinder of said second couple at one side of its piston and also connecting said transfer valve with the other of said chambers and with the cylinder of said second couple at the other side of its said piston.

6. A hydraulically actuated servo mechanism, comprising in combination: a housing including a cylindrical chamber for piston; a power output piston in said chamber; a control valve means including a valve spool, said control valve means adapted to supply hydraulic fluid under pressure to reversibly move said housing relative to said piston; walls defining a valve spool control chamber at each end of said valve spool; an electro-hydraulic transfer valve operable to cause flow of fluid under pressure into either of said valve spool control chambers to position said valve spool; a by-pass valve connecting said two valve spool chamber; an alternative means for moving said valve spool independently of said electro-hydraulic transfer valve; means for opening said by-pass valve when said alternative means is operating said valve spool; a double acting response piston moveable in a cylinder in response to relative motion between said power output piston and said housing; a conduit from each side of said response piston to one of said valve spool control chambers, whereby the operative effect of fluid from said transfer valve on said valve spool is reduced to an extent determined by the motion of said response piston.

References Cited in the file of this patent

UNITED STATES PATENTS

| | | |
|---|---|---|
| 752,491 | Warren | Feb. 16, 1904 |
| 2,227,375 | Carlson | Dec. 31, 1940 |
| 2,303,752 | Meredith | Dec. 1, 1942 |
| 2,324,516 | Kalin | July 20, 1943 |
| 2,352,344 | Rockwell | June 27, 1944 |
| 2,353,692 | Cunningham | July 18, 1944 |
| 2,613,650 | Mott | Oct. 14, 1952 |
| 2,637,303 | Cintron | May 5, 1953 |
| 2,675,679 | Parker | Apr. 20, 1954 |
| 2,678,177 | Chenery et al. | May 11, 1954 |
| 2,705,940 | Edwards | Apr. 12, 1955 |

FOREIGN PATENTS

| | | |
|---|---|---|
| 756,888 | Germany | Mar. 23, 1953 |